(12) United States Patent
Lee

(10) Patent No.: US 9,306,710 B2
(45) Date of Patent: Apr. 5, 2016

(54) RCC CONNECTION ESTABLISHMENT METHOD AND APPARATUS IN COMMUNICATION SYSTEM BACKGROUND OF THE INVENTION

(75) Inventor: Jung Hun Lee, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 264 days.

(21) Appl. No.: 13/128,325

(22) PCT Filed: Dec. 14, 2009

(86) PCT No.: PCT/KR2009/007461
§ 371 (c)(1),
(2), (4) Date: May 9, 2011

(87) PCT Pub. No.: WO2010/071333
PCT Pub. Date: Jun. 24, 2010

(65) Prior Publication Data
US 2011/0222482 A1 Sep. 15, 2011

(30) Foreign Application Priority Data
Dec. 16, 2008 (KR) .................. 10-2008-0127720

(51) Int. Cl.
- H04W 4/00 (2009.01)
- H04L 1/18 (2006.01)
- H04L 1/00 (2006.01)

(52) U.S. Cl.
CPC ......... H04L 1/189 (2013.01); *H04L 2001/0092* (2013.01)

(58) Field of Classification Search
CPC ...................................................... H04L 1/189

USPC ................................................... 370/328, 331
See application file for complete search history.

(56) References Cited

U.S. PATENT DOCUMENTS 7,821,992 B2 * 10/2010 Chun et al. ................... 370/329
8,391,905 B2 * 3/2013 Iwamura et al. ............. 455/509
(Continued)

FOREIGN PATENT DOCUMENTS

EP 1845749 A2 * 10/2007
KR 100548344 2/2006

OTHER PUBLICATIONS

PCT/ISA/237 Written Opinion issued on PCT/KR2009/007461 (3 pp.).
(Continued)

*Primary Examiner* — Asad Nawaz
*Assistant Examiner* — Syed S Ali
(74) *Attorney, Agent, or Firm* — The Farrell Law Firm, P.C.

(57) ABSTRACT

A method and apparatus for establishing a RRC connection between a base station and a mobile station in a wireless communication system is provided. A packet transmission method for a communication system including a transmitter and a receiver according to the present invention includes transmitting, at the transmitter, a packet; retransmitting, when a confirmation message is not received in response to the packet, the packet; and stopping, when the confirmation message is received in response to the packet, retransmission of the packet. An RRC connection establishment method and apparatus of the present invention allows the transmitter to retransmit the RRC Connection Response message periodically until the RRC Connection Complete message is received from the receiver, thereby improving the RRC connection success probability.

11 Claims, 5 Drawing Sheets

(56) References Cited

U.S. PATENT DOCUMENTS

| | | | |
|---|---|---|---|
| 8,423,026 B2* | 4/2013 | Iwamura et al. | 455/439 |
| 2004/0013105 A1* | 1/2004 | Ahmavaara et al. | 370/349 |
| 2007/0121540 A1* | 5/2007 | Sharp et al. | 370/328 |
| 2008/0039094 A1 | 2/2008 | Jeong et al. | |
| 2008/0069053 A1* | 3/2008 | Kim et al. | 370/332 |
| 2008/0170522 A1* | 7/2008 | Sammour et al. | 370/310 |
| 2008/0192703 A1* | 8/2008 | Suzuki | 370/335 |
| 2009/0131063 A1* | 5/2009 | Yi | H04W 76/02 455/450 |
| 2009/0201798 A1* | 8/2009 | Lee | H04W 74/002 370/216 |
| 2009/0327828 A1* | 12/2009 | Ojala et al. | 714/749 |
| 2010/0009682 A1* | 1/2010 | Iwamura et al. | 455/436 |
| 2010/0067454 A1* | 3/2010 | Lee et al. | 370/329 |
| 2010/0067604 A1* | 3/2010 | Bhadra et al. | 375/267 |
| 2010/0142470 A1* | 6/2010 | Park | H04L 1/188 370/329 |
| 2010/0195522 A1* | 8/2010 | Lee et al. | 370/252 |
| 2010/0216469 A1* | 8/2010 | Yi | H04W 48/20 455/435.3 |
| 2010/0226325 A1* | 9/2010 | Chun | H04W 28/065 370/329 |
| 2010/0325504 A1* | 12/2010 | Lee et al. | 714/748 |
| 2011/0021154 A1* | 1/2011 | Marinier et al. | 455/67.11 |
| 2011/0039536 A1* | 2/2011 | Lee | H04W 76/048 455/422.1 |
| 2011/0053597 A1* | 3/2011 | Lee | H04W 36/22 455/436 |
| 2011/0110258 A1* | 5/2011 | Ishii et al. | 370/252 |
| 2011/0159802 A1* | 6/2011 | Binti Harum et al. | 455/7 |
| 2011/0223943 A1* | 9/2011 | Fischer | 455/458 |
| 2013/0039339 A1* | 2/2013 | Rayavarapu et al. | 370/331 |
| 2013/0136082 A1* | 5/2013 | Kang et al. | 370/329 |

OTHER PUBLICATIONS

PCT/ISA/210 Search Report issued on PCT/KR2009/007461 (3 pp.).

* cited by examiner

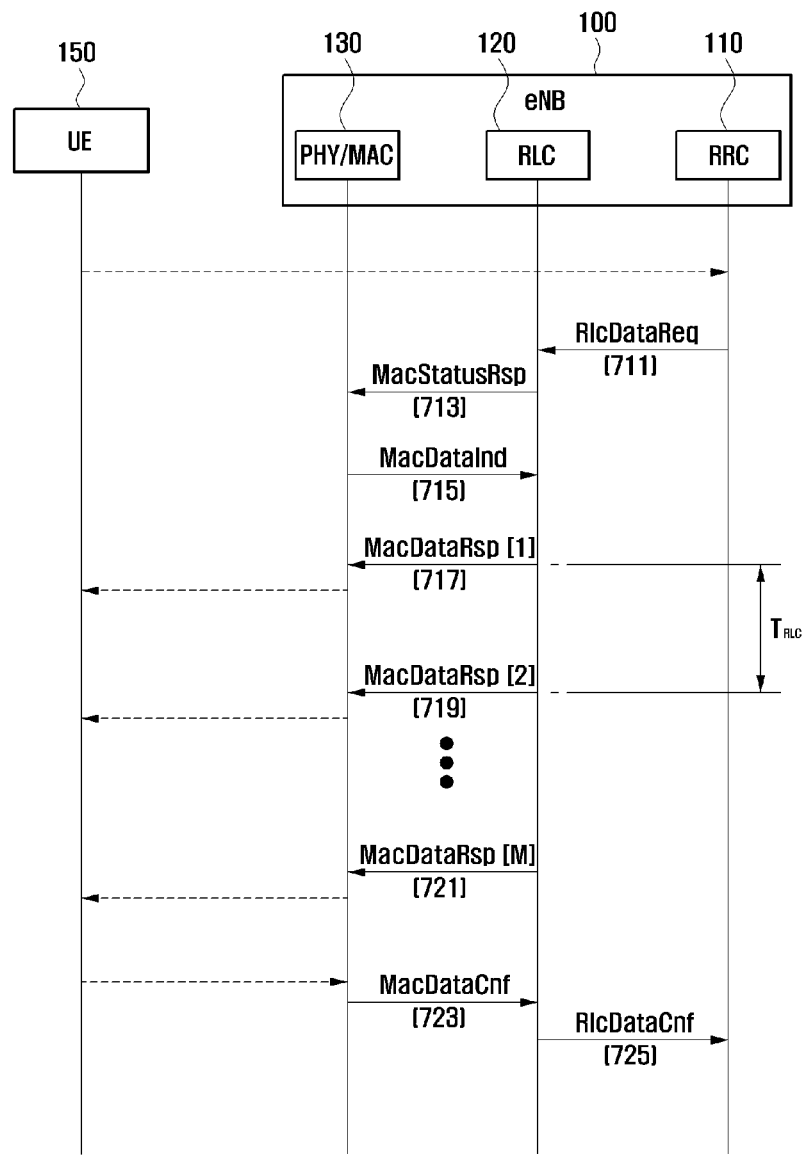

RCC CONNECTION ESTABLISHMENT METHOD AND APPARATUS IN COMMUNICATION SYSTEM BACKGROUND OF THE INVENTION

BACKGROUND OF THE INVENTION

1. Technical Field

The present invention relates to wireless communications and, in particular, to a method and apparatus for establishing a Radio Resource Control (RRC) connection between a base station and a mobile station in a wireless communication system.

2. Background Art

Universal Mobile Telecommunications System (UMTS) is one of the third generation (3G) mobile telecommunication technologies, which is evolved from Global System for Mobile communications (GSM) and General Packet Radio Services (GPRS) and uses Wideband Code Division Multiple Access (WCDMA).

The $3^{rd}$ Generation Partnership Project (3GPP), which is responsible for the standardization of UMTS, is working on to significantly extend the performance of UMTS in the work item Long Term Evolution (LTE). The objective of the next generation communication systems is to support high quality packet data services.

In LTE, Automatic Repeat Request (HARQ) and Hybrid ARQ (HARQ) are used to provide error correction functionality. The HARQ function checks the errors in the received packets and, if any error is detected, requests the transmitter for retransmission of corresponding packet. At this time, the receiver performs soft-combining to reduce the error occurrence probability. The ARQ function detects any missing packet and requests the transmitter for retransmission of the missing packet. That is, when the packet loss occurs while a base station is transmitting packets to a mobile station, the lost packet can be recovered by means of the ARQ and HARQ functions of the system.

DISCLOSURE OF INVENTION

Technical Problem

Meanwhile, in a wireless communication system, the base station and the mobile station have to establish a connection prior to start packet data communication. That is, the base station receives an attach request message transmitted by the mobile station and sends a response message in response to the attach request message. However, the base station does not know whether the mobile station has received the attach response message successfully. Accordingly, when the attach response message is lost in the wireless environment between the base station and the mobile station, the base station is likely to proceed the connection establishment procedure without guarantee about the receipt of the attach response message at the mobile station, resulting in low successful connection probability.

Solution to Problem

In order to solve the above problems of prior arts, the present invention provides an RRC connection establishment method and apparatus for a wireless communication system that is capable of improving the RRC connection success probability.

In accordance with an exemplary embodiment of the present invention, packet transmission method for a communication system including a transmitter and a receiver includes transmitting, at the transmitter, a packet; retransmitting, when a confirmation message is not received in response to the packet, the packet; and stopping, when the confirmation message is received in response to the packet, retransmission of the packet. Preferably, retransmitting the packet is performed periodically until the confirmation message is received. Preferably, the transmitter includes a Radio Resource Control (RRC) entity and a Radio Link Control (RLC) entity, and retransmitting the packet comprises triggering, at one of the RRC entity and the RLC entity, retransmission of the packet periodically at the time interval. Preferably, transmitting a packet is performed in response to a connection request message transmitted by the receiver, and the packet is a connection response message transmitted by the transmitter in response to the connection request message, and the confirmation message is a connection complete message transmitted by the receiver in response to the connection response message.

In accordance with another exemplary embodiment of the present invention, a packet reception method for a communication system including a transmitter and a receiver includes receiving, at the receiver, a packet transmitted by the transmitter; and transmitting a confirmation message indicating receipt of the packet to the transmitter; wherein the packet is initially transmitted or retransmitted when the confirmation message is not received. Preferably, the packet is retransmitted periodically at a time interval until the confirmation message is received. Preferably, the transmitter includes a Radio Resource Control (RRC) entity and a Radio link Control (RLC) entity, and the packet is transmitted by the RRC entity periodically at a predetermined interval time until the confirmation message is received or by the RLC entity periodically at a predetermined time interval until the confirmation message is received. The packet reception method further includes transmitting a connection request message to the transmitter, wherein the packet is a connection response message transmitted by the transmitter in response to the connection request message, and the confirmation message is a connection complete message transmitted by the receiver in response to the connection response message.

In accordance with another exemplary embodiment of the present invention, wherein a packet transmission apparatus for a communication system includes a Radio Resource Control (RRC) entity which generates a packet; and a Radio Link Control (RLC) entity which transmits the packet to a reception apparatus, retransmits the packet when a confirmation message is not received in response to the packet, stops retransmission of the packet when the confirmation message is received in response to the packet, and delivers the confirmation message to the RRC entity. Preferably, the packet is retransmitted periodically at a predetermined time interval until the confirmation message is received. Preferably, the packet is transmitted by the RRC entity periodically at a predetermined interval time until the confirmation message is received or by the RLC entity periodically at a predetermined time interval until the confirmation message is received. Preferably, the RRC entity generates the packet in response to a connection request message transmitted by the reception apparatus, the packet is a connection response message transmitted by the transmitter in response to the connection request message, and the confirmation message is a connection complete message transmitted by the receiver in response to the connection response message.

In accordance with still another exemplary embodiment of the present invention, a packet reception apparatus for a wireless communication system includes a Physical/Media Access Control (PHY/MAC) entity and a Radio Link Control (RLC) entity which receives a packet transmitted by a transmission apparatus; and a Radio Resource Control (RRC) entity which transmits a confirmation message acknowledging receipt of the packet to the transmission apparatus, wherein the packet is initially transmitted or retransmitted by the transmission apparatus when the confirmation message is not received in a predetermined time. Preferably, the transmission apparatus retransmits the packet periodically at a predetermined time interval until the confirmation message is received. Preferably, the RRC entity transmits a connection request message, the packet is a connection response message transmitted by the transmitter in response to the connection request message, and the confirmation message is a connection complete message transmitted by the receiver in response to the connection response message.

Advantageous Effects of Invention

The RRC connection establishment method and apparatus of the present invention allows the ENB to retransmit the RRC Connection Response message periodically until the RRC Connection Complete message is received from the UE, thereby improving the RRC connection success probability. That is, the ENB determines the safe receipt of the RRC Connection Response message at the UE depending on the receipt of the RRC Connection Complete message transmitted by the UE. Since the RRC Connection Response message is retransmitted periodically until the RRC Connection Complete message is received, the RRC connection success probability increases. Also, since the transmission power of the RRC Connection Response message increases in stepwise manner whenever the retransmission of the RRC Connection Response message is repeated, the RRC connection success probability further increases.

BRIEF DESCRIPTION OF DRAWINGS

The above and other objects, features and advantages of the present invention will be more apparent from the following detailed description in conjunction with the accompanying drawings, in which:

FIG. 7 is a sequence diagram illustrating operations of the transmission PHY/MAC, RLC, and RRC entities of the ENB for an RRC Connection Response retransmission in a wireless communication system according to an exemplary embodiment of the present invention

MODE FOR THE INVENTION

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

Figure 1:
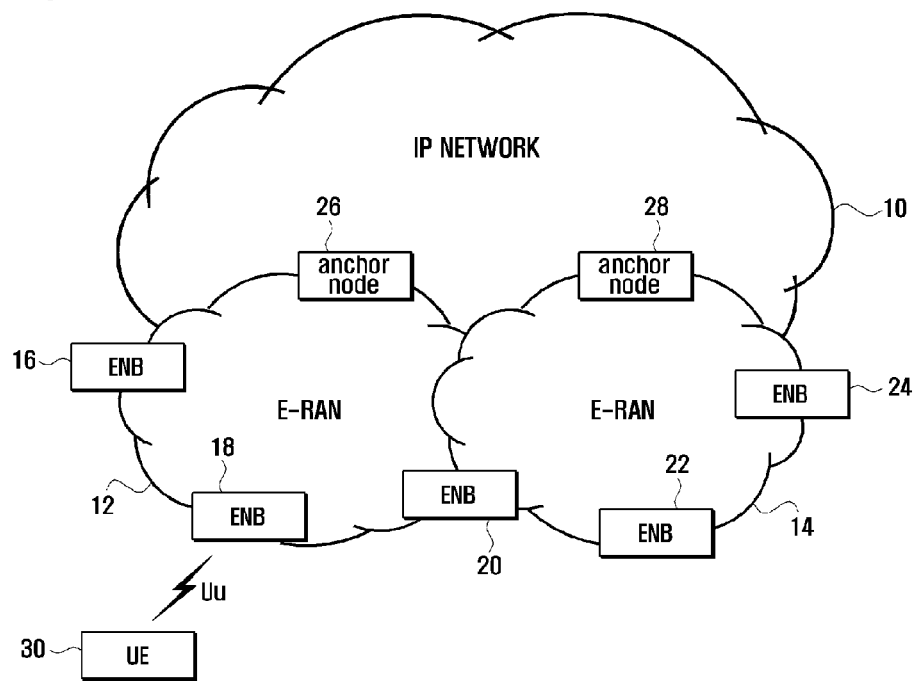
FIG. 1 is a diagram illustrating a system architecture of a wireless communication system to which the present invention is applied.

FIG. 1 is a diagram illustrating a system architecture of a wireless communication system to which the present invention is applied. The wireless communication system is based on the system architecture of the Universal Mobile Telecommunications System (UMTS).

As shown in FIG. 1, the wireless communication system includes an Internet Protocol (IP) network 10, Evolved UMTS Radio Access Networks (E-UTRANs) 12 and 14, and a User Equipment (UE) 30. The E-UTRAN 12 includes Evolved Node-Bs (ENBs) 16, 18, and 20 and an anchor node 26; and the E-UTRAN 14 includes ENBs 20 and 24 and an anchor node 28. The UE can access the IP network 10 via the E-UTRANs 12 and 14.

The UE accesses the ENBs 16, 18, 20, 22, and 24 via a Uu interface. In the above structure LTE system, all the user traffics including real time services such as Voice over IP (VoIP) are service through a shared channel, and the ENBs 16, 18, 20, 22, and 24 performs scheduling the traffics based on the collected status information. Similar to the High Speed Downlink Packet Access (HSDPA) and Enhanced Uplink Dedicated Channel (E-DCH) systems, the LTE system support the HARQ and ARQ between the UE 30 and the ENBs 10, 18, 120, 22, and 24.

Prior to explain the operations of the network entities, the Uu interface between the UE 30 and the ENBs 10, 18, 120, 22, and 24 is described.

Figure 2:
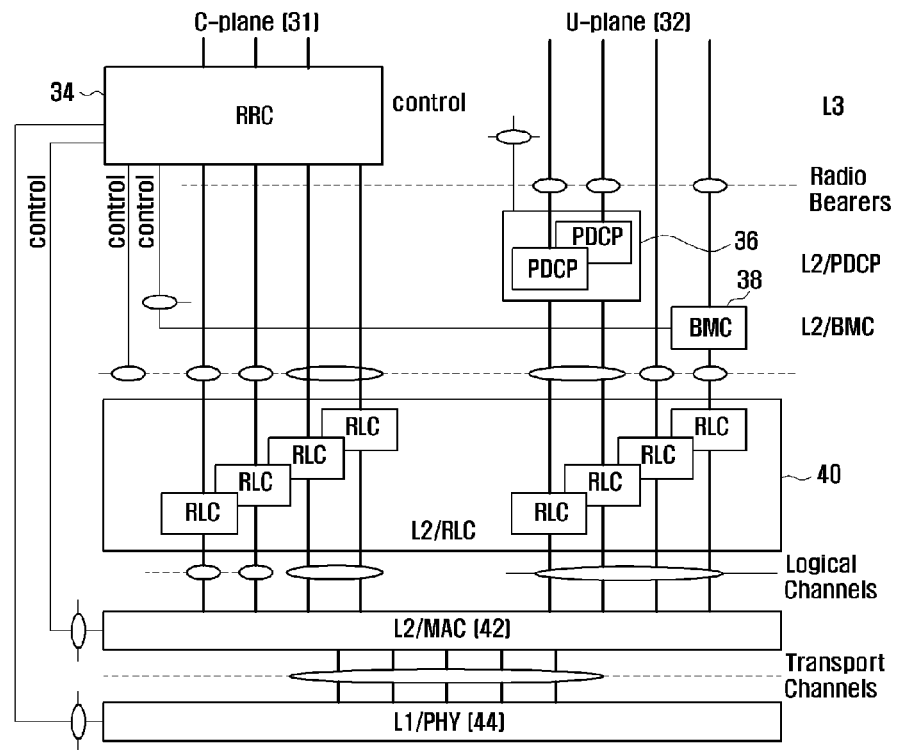
FIG. 2 is a diagram illustrating a radio interface protocol architecture or Radio Resource Control (RRC) sub-layer.

FIG. 2 is a diagram illustrating a radio interface protocol architecture or Radio Resource Control (RRC) sub-layer.

Referring to FIG. 2, the Uu interface is divided into a control Plane (C-Plane) 31 and a User Plane (U-Plane) 32. The C-Plane 31 is a region that handles control information for an interface between the UE 31 and the ENBs 16, 18, 20, 22, and 24. In the C-Plane 31, L3 is partitioned into sub-layers where the lowest sub-layer, denoted as Radio Resource Control (RRC) 34, interfaces with L2 including Radio Link Control (RLC) layer 40, Media Access Control (MAC) layer 42, and Physical (PHY) layer 44. The U-Plane 32 includes Packet Data Control Protocol (PDCP) layer 36, Broadcast/Multicast Control (BMC) layer 38, RLC layer 40, MAC layer 42, and PHY layer 44.

The PHY layer 44 corresponds to Layer 1 (L1) of the Open Systems Interconnection (OSI) model; and the MAC layer 42, RLC layer 40, BMC layer 38, and PDCP layer 36 are included in Layer 2 (L2); and the RRC layer 34 is included in Layer 3 (L3). Here, the service access points (SAPs) between the RLC layer 40 and the MAC layer 42 provide logical channels, and the SAPs between the MAC layer 42 and the PHY layer 44 provide transport channels. A logical channel is characterized by the type of information that is transferred over the radio interface, and a transport channel is characterized by how the information is transferred over the radio interface.

The exemplary embodiments of the present invention are described on the basis of the above structured system and radio interface protocol architectures.

Figure 3:
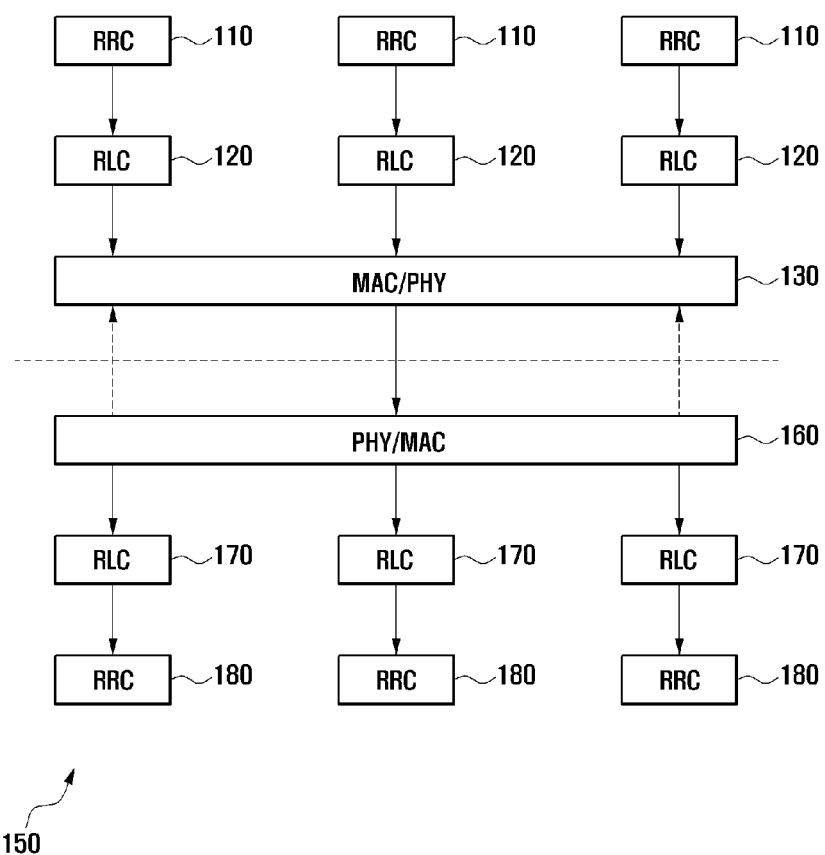
FIG. 3 is a diagram illustrating how the upper layer data are processed in the ENB and the UE in a communication system according to an exemplary embodiment of the present invention.

FIG. 3 is a diagram illustrating how the upper layer data are processed in the ENB and the UE in a communication system according to an exemplary embodiment of the present invention. In the exemplary embodiment of FIG. 3, the communication system is an LTE system.

Referring to FIG. 3, an ENB 100 includes plural transmission RRC entities 110, plural transmission RLC entities 120, and transmission MAC/PHY entities 130. The RRC entity is activated per service and responsible for IP header compression. The transmission RRC entity 110 generates packets, i.e. RLC Service Data Units (SDUs). The transmission RLC entity 120 is connected to a corresponding RRC entity 110. The transmission RLC entity 120 segments the RLC SDU into several RLC Protocol Data Units (PDUs) and is responsible for ARQ. The transmission MAC/PHY entity 130 is configured to connect to multiple transmission RLC entities 120. The MAC/PHY entity 130 multiplexes the RLC PDUs into MAC PDUs and is responsible for HARQ.

In an exemplary embodiment of the present invention, a UE 150 includes a reception MAC/PHY entity 130, plural reception RLC entities 170, and plural reception RRC entities 180. The reception PHY/MAC entity 160 demultiplexes the MAC PDUs received from the ENB 150 into RLC PDUs. The reception RLC entities 170 receive corresponding RLC PDUs provided by the reception PHY/MAC entity 160 and extract the RLC SDUs. The RRC entities 180 are connected to the corresponding reception RLC entities. The reception RRC entity 180 is activated per service and is responsible for IP header decompression.

With the above described operations of protocol entities, the ENB 100 and the UE 150 performs RRC packet communication. That is, the ENB 100 sends a packet to the UE 150, and the UE 150 sends the ENB 100 an acknowledgement message for the packet. If no acknowledgement message is received after transmission of the packet, the ENB 100 retransmits the packet and, if an acknowledgement message is received, stops retransmission. The ENB 100 and the UE 150 can exchange RRC packets for establishing an RRC connection.

Figure 4:
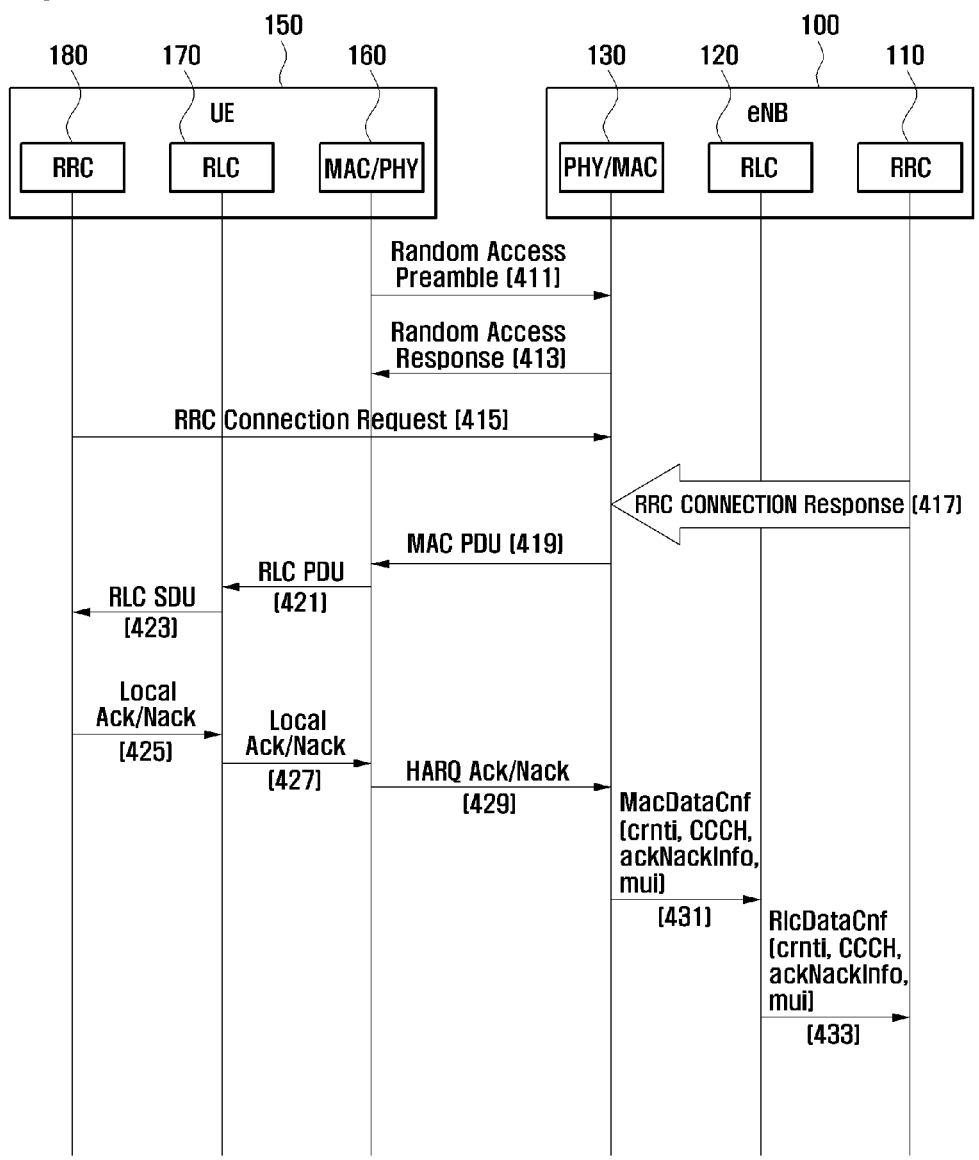
FIG. 4 is a sequence diagram illustrating operations of protocol entities of an ENB and a UE for RRC connection establishment in a wireless communication system according to an exemplary embodiment of the present invention.

FIG. 4 is a sequence diagram illustrating operations of protocol entities of an ENB and a UE for RRC connection establishment in a wireless communication system according to an exemplary embodiment of the present invention.

Referring to FIG. 4, the RRC connection establishment is triggered by a reception MAC/PHY entity 160 of the UE 150 sending a Random Access Preamble message (411). Upon receipt of the Random Access Preamble message transmitted by the UE 150, the transmission PHY/MAC entity 130 of the ENB 100 sends a Random Access Response message to the UE 150.

The ENB 100 can check the radio channel condition between the ENB 100 and the UE 150 based on the Random Access Preamble Message. That is, the transmission PHY/MAC entity 130 calculates propagation delay of the Random Access Preamble message and determines the radio channel condition between the ENB 100 and the UE 150 based on the calculation result. For instance, if the propagation delay between the ENB 100 and the UE 150 is greater than a predetermined threshold value, the transmission PHY/MAC entity 130 determines that the channel condition is relatively good. Otherwise, if the propagation delay between the ENB 100 and the UE 150 is equal to or less than the threshold value, the transmission PHY/MAC entity determines that the channel condition is relatively bad. The transmission PHY/MAC entity 130 can measure the physical distance between the ENB 100 and UE 150, i.e. the location of the UE 150 within the cell of the ENB 100.

The transmission PHY/MAC entity 130 allocates uplink radio resource for RRC connection request and Cell Radio Network Temporary Identifier (CRNTI) to the UE 150. The Random Access Response message includes the radio resource allocation information and the CRNTI for the UE 150. The transmission PHY/MAC entity 130 also stores the propagation delay between the ENB 100 and the UE 150 along with the CRNTI allocated to the UE 150.

If the Random Access Response message is received, the UE 150 sends an RRC Connection Setup or RRC Connection Reestablishment message to the ENB 100 (415). At this time, the UE 150 analyzes the Random Access Response message and generates the RRC Connection Request based on the radio resource allocation information and the CRNTI contained in the Random Access Response message. Upon receipt of the RRC connection Request message, the ENB 100 generates an RRC Connection Response message (417).

The RRC Connection Response message generation process is described in more detail with reference to FIG. 5.

Figure 5:
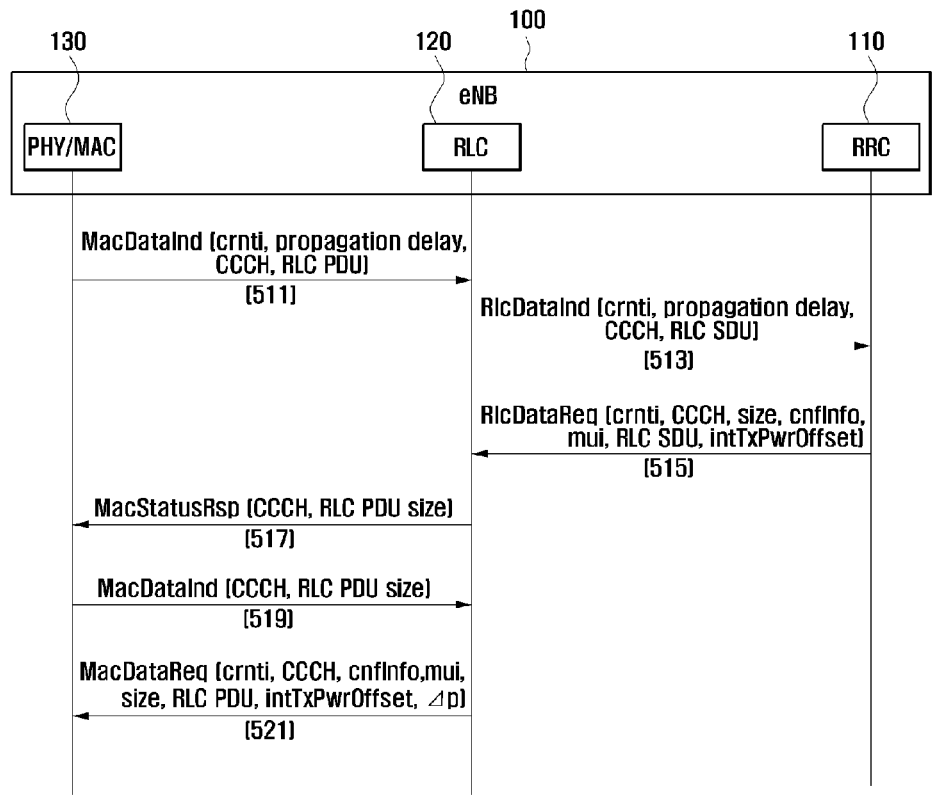
FIG. 5 is a sequence diagram illustrating signaling among the PHY/MAC, RLC, and RRC entities of the ENB in the RRC Connection Response message generation process of FIG. 4.

FIG. 5 is a sequence diagram illustrating signaling among the PHY/MAC, RLC, and RRC entities of the ENB in the RRC Connection Response message generation process of FIG. 4.

Referring to FIG. 5, once the RRC Connection Request message is received, the transmission PHY/MAC entity 130 extracts an RLC PDUs from the RRC Connection Request message and delivers the RLC PDUs to the transmission RLC entity 120 by means of a MacDataInd primitive (511). The MacDataInd primitive includes the CRNTI of the UE 150, propagation delay, and logical channel type (i.e. Common Control Channel) information as well as the RLC PDUs. Upon receipt of the MacDataInd primitive, the transmission RLC entity 120 assembles the RLC PDUs into an RLC SDU and delivers the RLC SDU to the transmission RRC entity 110 by means of an RlcDataInd primitive (513). The RlcDataInd primitive includes the CRNTI of the UE 150, propagation delay, and the logical channel type (i.e. Common Control Channel) information as well as the RLC SDU.

If the RlcDataInd primitive is received, the transmission RRC entity 110 generates an RRC Connection Response message and delivers the RRC Connection Response message to the transmission RLC entity 120 by means of an RlcDataReq primitive (515). At this time, the ENB 100 determines the initial response transmission power (initTxPwrOffset) for transmitting the RRC Connection Response message based on the propagation delay value. The ENB 100 can store the initial response transmission power values corresponding to reference propagation delay values in the form of a database. The ENB 100 also can include an algorithm for calculating the initial response transmission power in correspondence with the propagation delay value. The RlcDataReq primitive includes the CRNTI of the UE 150, initial response power, RLC SDU packet size, RLC SDU packet identifier (Message unit Identifier; MUI), flag for requesting confirm reply corresponding to the packet identifier (cnfinfo), and a logical channel type for the RRC connection, as well as the RLC SDU.

Upon receipt of the RlcDataReq primitive, the transmission RLC entity 120 sends the RLC packet size for transmission to the UE 150 in unit of Transmission Time Interval (TTI) to the transmission PHY/MAC entity 130 by means of a MacStatusRsp primitive (517). The MacStatusRsp primitive includes the logical channel type for the RRC connection as well as the RLC PDU size. Upon receipt of the MacStatusRsp primitive, the transmission PHY/MAC entity 130 feeds back the RLC PDU size for transmission to the UE 150 in unit of TTI to the transmission RLC entity 120 by means of a MacDataInd primitive (519). That is, the transmission PHY/ MAC entity 130 allocates Resource Blocks to the UE 150 using the RLC PDU size. The RLC PDU size for transmission at the RLC entity 120 can be changed to the packet size of the RLC PDU for transmission at the PHY/MAC entity 130. The MacStatusInd primitive includes the logical channel type for the RRC connection as well as the RLC PDU size.

Upon receipt of the MacDataInd primitive, the transmission RLC entity 120 segments the RLC SDU into RLC PDUs and delivers the RLC PDUs to the transmission PHY/mace entity 130 by means of a MacDataReq primitive (521). The MacDataReq primitive includes the CRNTI of the UE 150, initial response transmission power, RLC PDU size, message identifier of the corresponding PDU, confirm information flag for requesting receipt reply corresponding to the message identifier, and logical channel type for the RRC connection, as well as the RLC PDUs. The transmission RLC entity 120 determines the power increment amount ($\Delta P$) according to a number of retransmission of the RLC PDU, and delivers the power increment amount ($\Delta P$) to the transmission PHY/MAC entity 130 by means of the MacDataReq primitive. The ENB 100 can store the power increment amounts according to the number of retransmission per initial response transmission power in the form of a database. Also, the ENB 100 can include an algorithm for calculating the power increment amount based on the initial response transmission power and the number of retransmissions.

Returning to FIG. 4, if the RRC Connection Response message is generated, the transmission PHY/MAC entity 130 sends the RRC connection Response message to the UE 150 (419). At this time, the transmission PHY/MAC entity 130 multiplexes the RLC Connection Response message into a MAC PDU and transmits the MAC PDU to the UE 150. If the MAC PDU carrying the RRC Connection Response message is received, the reception MAC/PHY entity 160 demultiplexes the MAC PDU into the RLC PDUs and delivers the RLC PDUs to the reception RLC entity 170 (421). The reception RLC entity 170 assembles the RLC PDUs into an RLC SDU and delivers the RLC SDU to the RRC entity 180 (423).

Upon receipt of the RLC SDU, the reception RRC entity 180 delivers an RRC Connection Complete (RRC Connection Setup Complete or RRC Connection Reestablishment Complete) message to the reception RLC entity 170. At this time, the reception RRC entity 180 determines whether there is a lost packet, and delivers the RRC Connection Complete message by means of a local ACK/NACK message depending on the determination result. If the local ACK/NACK message is received, the reception RLC entity 170 delivers the local ACK/NACK message to the reception MAC/PHY entity 160 (427). The reception MAC/PHY entity 160 sends an HARQ ACK/NACK message carrying the RRC Connection Complete message to the ENB 100 (429).

Upon receipt of the RRC Connection Complete message, the transmission PHY/MAC entity 130 of the ENB 100 delivers the RRC Connection Complete message to the transmission RLC entity 120 by means of a MacDataCnf primitive (431). The MacDataCnf primitive includes the CRNTI of the UE 150, packet identifier of the RLC PDU, packet loss information of the RLC PDU (AckNackInfo), and logical channel type for the RRC connection. If the MacDataCnf primitive is received, the transmission RLC entity 120 delivers the RRC connection Complete message to the transmission RRC entity 110 by means of a RlcDataCnf primitive (433). The RlcDataCnf primitive includes the CRNTI of the UE 150, packet identifier of the RLC PDU, packet loss information of the RLC PDU (AckNackinfo), and logical channel type for the RLC connection. Once the RRC Connection Complete message is received from the ue 150, the ENB 100 determines that the RRC Connection Response message has been successfully received by the UE 150, and makes a progress of the RRC connection procedure between the ENB 100 and the UE 150.

The ENB 100 can retransmit the RRC Connection Response message. the RRC Connection Response message retransmission procedure is described hereinafter with reference to FIGS. 6 and 7.

Figure 6:
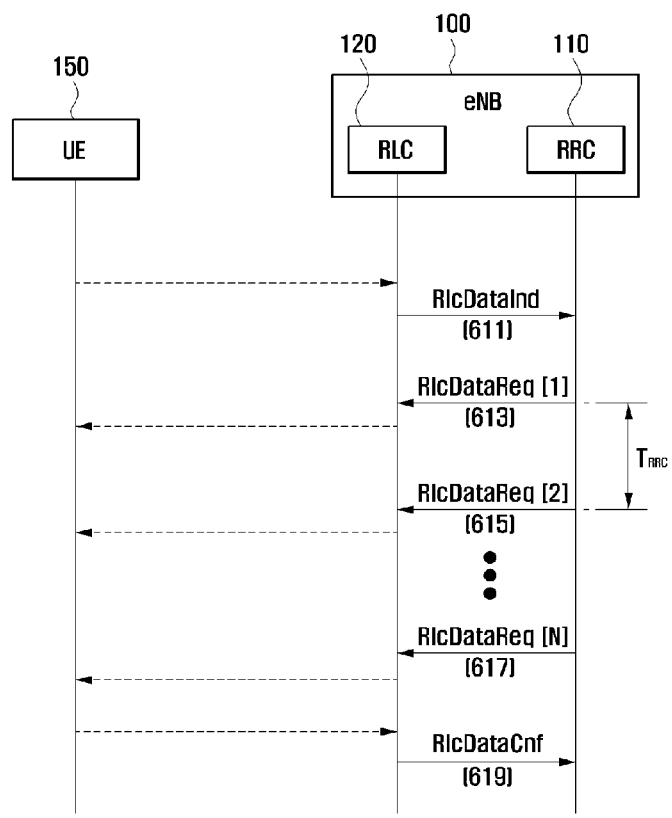
FIG. 6 is a sequence diagram illustrating operations of the transmission RLC and RRC entities of the ENB for an RRC Connection Response retransmission in a wireless communication system according to an exemplary embodiment of the present invention.

FIG. 6 is a sequence diagram illustrating operations of the transmission RLC and RRC entities of the ENB for an RRC Connection Response retransmission in a wireless communication system according to an exemplary embodiment of the present invention. In the exemplary embodiment of FIG. 6, the RRC Connection Response retransmission is dominated by the transmission RRC entity 110 of the ENB 100.

Referring to FIG. 6, if an RRC Connection Request message is received from the UE 150, the transmission RLC entity 120 of the ENB 100 delivers the RRC Connection Request message to the transmission RRC entity 110 by means of an RlcDataInd primitive (611). The transmission RRC entity 110 delivers an RRC Connection Response message to the transmission RLC entity 120 by means of a RrlDataReq primitive in response to the RlcDataInd primitive (613). At this time, the transmission RLC entity 120 determines the initial response transmission power based on the propagation delay value extracted from the RRC Connection Request message. The RlcDataReq primitive includes an initial response transmission power value as well as the RRC Connection Response message. As a consequence, the ENB 100 transmits the RRC Connection Response message to the UE 150 with the initial response transmission power.

After the delivery of the RlcDataReq primitive, the transmission RRC entity 110 waits for receiving an RRC Connection Complete message. If no RRC Connection Complete message is received in a predetermined time, the transmission RRC entity 110 redelivers the RRC Connection Response message to the transmission RLC entity 120 by means of the RlcDataRequest primitive (615). The predetermined time for redelivery of the RRC Connection Response message is called RRC Response Waiting Timer ($T_{RRC}$). As a consequence, the ENB 100 retransmits the RRC Connection Response message to the UE 150 at the interval of $T_{RRC}$.

If no RRC Connection Complete message is received in the $T_{RRC}$ after the retransmission of the RRC Connection Response message, the transmission RRC entity 110 redelivers the RRC Connection Response message to the transmission RLC entity 120 by means of the RlcDataRequest primitive again (617). The RRC Connection Response message can be retransmitted N times. The transmission RRC entity 110 redelivers the RlcDataReq primitive at the time when the $T_{RRC}$ expires. That is, the ENB 100 can perform retransmission of the RRC Connection Response to the UE 150 N times at the time interval of $T_{RRC}$.

If the ENB 100 receives the an RRC Connection Complete message in $T_{RRC}$ after the retransmission of the RRC Connection Response message, the transmission RLC entity 120 of the ENB 100 delivers the RRC Connection Complete message to the transmission RRC entity 110 by means of a RlcDataCnf primitive (619). Upon receipt of the RlcDataCnf primitive, the transmission RRC entity 110 recognizes that the RRC Connection Response message has been successfully received by the UE 150 and stops redelivery of the RlcDataReq primitive. At this time, the transmission RRC entity 110 discards the data buffered for the retransmission of the RRC Connection Response message.

FIG. 7 is a sequence diagram illustrating operations of the transmission PHY/MAC, RLC, and RRC entities of the ENB for an RRC Connection Response retransmission in a wireless communication system according to an exemplary embodiment of the present invention. In the exemplary embodiment of FIG. 7, the RRC Connection Response retransmission is dominated by the transmission RLC entity of the ENB 100.

Referring to FIG. 7, if a transmission RRC Connection Request message is received, from the UE 150, the transmission RRC 110 delivers an RRC Connection Response message to the transmission RLC entity 120 by means of an RlcDataReq primitive (711). Upon receipt of the RlcDataReq primitive, the transmission RLC entity 120 delivers the RRC Connection Response message to the transmission PHY/MAC entity 130 by issuance of a MacStatusRsp primitive (713). Upon receipt of the MacStatusRsp primitive, the transmission PHY/MAC entity 130 delivers a MacDataInd primitive to the transmission RLC entity 120 (715). If the MacDataInd primitive is received, the transmission RLC 120 delivers the RRC Connection Response message to the transmission PHY/MAC entity 130 by means of a MacDataRsp primitive (717). As a consequence, the ENB 100 transmits the RRC Connection Response message to the UE 150 with an initial response transmission power.

After the delivery of the MacDataRsp primitive, the transmission RLC entity 120 waits for receiving an RRC Connection Complete message. If not RRC Connection Complete message is received in a predetermined time, the transmission RLC entity 120 redelivers the RRC Connection Response message to the transmission PHY/MAC entity 130 (719). The predetermined time for redelivery of the RRC Connection Response message is called RRC Response Waiting Timer ($T_{RRC}$). At this time, the transmission RLC entity 120 determines a first power increment amount ($\Delta P_1$) according to a number of retransmission of the RRC Connection Response message and redelivers the MacDataReq primitive including the power increment amount. As a consequence, the ENB 100 adjusts a first response transmission power as much as the first power increment amount ($\Delta P_1$) to a second response transmission power and retransmits the RRC Connection Response message to the UE 150 with the second response transmission power.

If no RRC Connection Complete message is received in the $T_{RRC}$ after the retransmission of the RRC Connection Response message, the transmission RLC entity 120 redelivers the RRC Connection Response message to the transmission PHY/MAC entity 130 by means of the MacDataRsp primitive again (721). The RRC Connection Response message can be retransmitted M times. The transmission RLC entity 120 redelivers the RlcDataRsp primitive at the time when the $T_{RRC}$ expires. The transmission RLC entity 120 determines the $(M-1)^{th}$ power increment amount ($\Delta P_{M-1}$) according to the number of retransmission of the RRC Connection Response message and redelivers the MacDataReq primitive to the transmission PHY/MAC entity 130 including the power increment amount. In an exemplary embodiment of the present invention, some of the first to $(M-1)^{th}$ power increment amounts can be identical with each other or all of the first to $(M-1)^{th}$ power increment amounts can be different from each other. As a consequence, the ENB 100 adjusts the previous response transmission power (e.g. the first response transmission power) as much as the $(M-1)^{th}$ power increment amount to the second response transmission power and retransmits the RRC Connection Response message to the UE 150 with the second response transmission power. The retransmission of the RLC Connection Response message can be performed less than the maximum number of retransmission times (M).

If the ENB 100 receives an RRC Connection Complete message in $T_{RRC}$ after the retransmission of the RRC Connection Response message, the transmission PHY/MAC entity 130 delivers the RRC Connection Complete message to the transmission RLC entity 120 by means of a MacDataCnf primitive (723). Upon receipt of the RlcDataCnf primitive, the transmission RLC entity 120 recognizes that the RRC Connection Response message has been successfully received by the UE 150 and stops redelivery of the MacDataRsp primitive. Next, the transmission RLC entity 120 delivers the RRC Connection Complete message to the transmission RRC entity 110 by means of an RlcDataCnf primitive (725). At this time, the transmission RLC entity 120 discards the data for buffered for the retransmission of the RRC Connection Response message.

Although the RRC connection establishment method is directed to the cases where one of transmission RLC entity and transmission RRC entity of the ENB dominates the retransmission of RRC Connection Response message in the above exemplary embodiments, the present invention is not limited thereto. That is, the RRC connection Response message retransmission procedure can be implemented with the cooperation of the transmission RLC entity and the transmission RRC entity. For instance, the transmission RRC entity can deliver the RRC Connection Response message to the transmission RLC entity by means of the RlcDataReq primitive less than a predetermined number of RLC Connection Response message retransmissions. For another instance, the transmission RLC entity delivers the RRC Connection Response message to the PHY/MAC entity by means of a MacDataReq primitive less than a predetermined number of RLC Connection Response message retransmissions.

Although the RRC connection establishment method is directed to the case where the RRC Connection Complete message is triggered by the RRC entity of the UE in the above exemplary embodiments, the present invention is not limited thereto. That is, the RRC connection establishment method can be implemented such that the RRC Connection Complete message is triggered by the MAC/PHY entity of the UE. For instance, the MAC/PHY entity of the UE can transmit the RRC Connection Complete message to the ENB in response to the RRC Connection Response message transmitted by the ENB without reception of the RRC Connection Complete message from the RRC entity or the RLC entity of the UE. At this time, the RRC Connection Complete message can be carried by an HARQ Response message.

Although the RRC connection establishment method is directed to the case where the ENB recognizes the safe receipt of the RRC Connection Response message at the UE with the receipt of the RRC Connection Complete message transmitted by the UE in the above exemplary embodiments, the present invention is not thereto. That is, the RRC Connection establishment can be implemented such that the ENB can recognize the safe receipt of the RRC Connection Response message at the UE without receipt of the RRC Connection Complete message. For instance, the RLC entity of the ENB can deliver an RRC Connection Complete information (cnfinfo=0) to the RRC entity of the ENB by issuing an RlCDataCnf primitive for informing the safe receipt of the RRC Connection Response message at the UE after the transmission of the RRC Connection Response message. At this time, the RLC entity of the ENB can deliver the RRC Connection Complete information in response to a confirm information flag for requesting confirm information corresponding to a corresponding packet identifier carried by the RlcDataReq primitive. The RLC entity of the ENB can deliver the CRNTI of the UE and the packet identifier of the corresponding RLC SDU to the RRC entity of the ENB by means of the RlcDataCnf primitive. If the RRC Connection Complete information is received, the RRC entity of the ENB recognizes the safe receipt of the RRC Connection Response message at the UE.

Although the RRC connection establishment method is directed to the case where the RRC Connection Response message is transmitted in response to the RRC Connection Response message and the RRC Connection Complete message is transmitted in response to the RRC Connection Response message, the present invention is not limited thereto.

In an exemplary embodiment of the present invention, the ENB can retransmit the RRC Connection Response message to the UE periodically until the RRC Connection Complete message is received in response to the RRC Connection Response message. That is, the ENB can recognize the safe receipt of the RRC Connection Response message when the RRC Connection Complete message is received in response to the RRC Connection Response message. By retransmitting the RRC Connection Response message until the receipt of the RRC Connection Response message at the UE is confirmed, it is possible to improve the RRC connection success probability. Since the ENB performs the retransmission of the RRC Connection Response message with the increase of the response transmission power in stepwise manner, it is possible to further improve the RRC connection success probability. In this manner, the ENB judges the safe receipt of the RRC Connection Response message at the UE and performs the retransmission of the RRC Connection Response message depending on the judgment result, resulting in improvement of connection success probability.

As described above, the RRC connection establishment method and apparatus of the present invention allows the ENB to retransmit the RRC Connection Response message periodically until the RRC Connection Complete message is received from the UE, thereby improving the RRC connection success probability. That is, the ENB determines the safe receipt of the RRC Connection Response message at the UE depending on the receipt of the RRC Connection Complete message transmitted by the UE. Since the RRC Connection Response message is retransmitted periodically until the RRC Connection Complete message is received, the RRC connection success probability increases. Also, since the transmission power of the RRC Connection Response message increases in stepwise manner whenever the retransmission of the RRC Connection Response message is repeated, the RRC connection success probability further increases.

INDUSTRIAL APPLICABILITY

Although exemplary embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

The invention claimed is:

1. A packet transmission method of a base station in a communication system, the method comprising:
   receiving a random access preamble message from a terminal;
   transmitting a random access response message including information associated with a radio resource control (RRC) connection, to the terminal;
   receiving a connection request message generated based on the information from the terminal;
   transmitting a connection response message in response to the connection request message to the terminal;
   determining whether a connection complete message is received from the terminal to avoid losing the connection response message;
   retransmitting, if the connection complete message is not received, the connection response message to the terminal, periodically until the connection complete message is received, by controlling transmission power of the connection response message, wherein retransmitting the connection response message comprises triggering, at one of an RRC entity and a Radio Link Control (RLC) entity, retransmission of the connection response message; and
   establishing, if the connection complete message is received from the terminal, a connection between the base station and the terminal, wherein the base station comprises the RRC entity and the RLC entity.

2. The packet transmission method of claim 1, wherein retransmitting the connection response message is performed until the connection complete message is received.

3. The packet transmission method of claim 2, wherein the retransmission of the connection response message is performed periodically at a predetermined time interval.

4. A packet reception method of a terminal in a communication system, the method comprising:
   transmitting a random access preamble message to a base station comprising a radio resource control (RRC) entity and a Radio link Control (RLC) entity;
   receiving a random access response message including information associated with a RRC connection, from the base station;
   transmitting a connection request message generated based on the information, to the base station;
   receiving connection response message transmitted by the base station; and
   transmitting a connection complete message indicating receipt of the connection response message to the transmitter;
   wherein the connection response message is initially transmitted or retransmitted, periodically until the connection complete message is received, by controlling transmission power of the connection response message if the connection complete message is not received at the base station to avoid losing the connection response message, and the connection response message is retransmitted by triggering, at one of the RRC entity and the RLC entity, retransmission of the connection response message.

5. The packet reception method of claim 4, wherein the connection response message is retransmitted until the connection complete message is received at the base station.

6. The packet reception method of claim 5, wherein the connection response message is transmitted by the RRC entity periodically at a predetermined time interval until the connection complete message is received or by the RLC entity periodically at a predetermined time interval until the connection complete message is received.

7. A packet transmission apparatus of a base station in a communication system, the apparatus comprising:
   a Radio Resource Control (RRC) entity which generates a packet; and a Radio Link Control (RLC) entity which receives a random access preamble message from a terminal, transmits a random access response message including information associated with an RRC connection, to the terminal, receives a connection request message generated based on the information, from the terminal, transmits a connection response message to the terminal in response to a connection request message received from the terminal, determines whether a connection complete message is received from the terminal to avoid losing the connection response message, retransmits the connection response message, periodically until the connection complete message is received, by controlling transmission power of the connection response message if the connection complete message is not received, delivers the connection complete message to the RRC entity, if the connection complete message is received from the terminal, and establishes a connection between the base station and the terminal, wherein retransmitting the connection response message comprises triggering, at one of the RRC entity and the RLC entity, retransmission of the connection response message.

8. The packet transmission apparatus of claim 7, wherein the connection response message is retransmitted until the connection complete message is received.

9. The packet transmission apparatus of claim 8, wherein the connection response message is transmitted by the RRC entity periodically at a predetermined time interval until the connection complete message is received or by the RLC entity periodically at a predetermined time interval until the connection complete message is received.

10. A packet reception apparatus of a terminal in a wireless communication system, the apparatus comprising:

a Physical/Media Access Control (PHY/MAC) entity and a Radio Link Control (RLC) entity which receives a connection response message transmitted by a transmission apparatus of a base station; and a Radio Resource Control (RRC) entity which transmits a random access preamble message to a base station, receives a random access response message including information associated with an RRC connection, from the base station, transmits a connection request message generated based on the information, to the base station, receives connection response message transmitted by the base station, and transmits a connection complete message acknowledging receipt of the connection response message to the transmission apparatus, wherein the connection response message is initially transmitted or retransmitted periodically until the connection complete message is received by the base station by controlling transmission power of the connection response message if the connection complete message is not received at the base station in a predetermined time to avoid losing the connection response message, and wherein the connection response message is retransmitted by triggering, at one of the RRC entity and the RLC entity, retransmission of the connection response message.

11. The packet reception apparatus of claim 10, wherein the connection response message is retransmitted periodically at a predetermined time interval until the connection complete message is received at the base station.

* * * * *